United States Patent [19]

Marshall

[11] 4,078,713

[45] Mar. 14, 1978

[54] BRAZING SINTERED FERROUS POWDER METAL ARTICLES

[75] Inventor: Robert W. Marshall, W. Bloomfield, Mich.

[73] Assignee: Chrysler Corporation, Highland Park, Mich.

[21] Appl. No.: 789,044

[22] Filed: Apr. 20, 1977

[51] Int. Cl.$^2$ .................. B23K 1/04; B23K 35/30
[52] U.S. Cl. .................................. 228/220; 228/238; 228/263
[58] Field of Search ............... 228/248, 245, 238, 220, 228/263

[56] References Cited

U.S. PATENT DOCUMENTS

| | | |
|---|---|---|
| 3,524,774 | 8/1970 | Volker et al. ............... 228/263 X |
| 3,656,226 | 4/1972 | Burne ........................ 228/263 X |
| 3,717,442 | 2/1973 | Knopp ....................... 228/263 X |

OTHER PUBLICATIONS

*Brazing Manual,* E. Fenton, editor, Second Edition American Welding Society, New York, N. Y. 1963, p. 39.

*Primary Examiner*—Donald G. Kelly
*Assistant Examiner*—K. J. Ramsey
*Attorney, Agent, or Firm*—Baldwin & Newtson

[57] ABSTRACT

Method of brazing sintered ferrous powder metal articles using as a brazing material alloy compositions which essentially include copper and phosphorous.

14 Claims, No Drawings

BRAZING SINTERED FERROUS POWDER METAL ARTICLES

BACKGROUND OF THE INVENTION

To date, effecting a repair on or forming a joint with ferrous powder metal articles by brazing has been very limited and of a special nature. The porous structure of conventional sintered ferrous articles, when contacted by commercial brazing alloys (in the liquid state), acts like a wick or sponge. The brazing alloy is carried away from the brazing area and/or joint site by the capillary action of the pores. This tends to produce unsatisfactory bonds or no bond at all.

SUMMARY OF THE INVENTION

It is the principal object of the present invention to provide an improved method of brazing sintered powder metal ferrous articles or parts for the purpose of repairing the same or joining them with other sintered powder metal articles, particularly powder metal iron and steel, or other brazeable articles. In addition to repairing sintered powder metal ferrous articles, the method of the invention is applicable to forming joints between such articles and other articles, such as dense ferrous materials, i.e., cast iron, wrought steel, and the like.

In accordance with the present invention, a sintered ferrous article to be brazed is contacted by a brazing alloy consisting essentially of an alloy of copper and phosphorous. The alloy is then heated to a temperature between its melting point and the melting point of copper (about 1980° F) where it is held for a time sufficient to melt the alloy and subsequently allowed to cool, producing a metallurgical bond.

DESCRIPTION OF THE PREFERRED EMBODIMENT

The present invention contemplates brazing ferrous sintered powder metal parts generally, both for repairing such articles as in repairing surface cracks and the like and for joining such articles to other articles.

The metallurgy of the sintered powder metal art is primarily based on alloys of the iron-copper-carbon system. Iron is the base material. Copper typically ranges from about 0-20% by weight. Carbon typically ranges from about 0-0.8% by weight. Various combinations of this system are used depending on the properties required in the finished article. Other additions are used at times. For example, low percentages of nickel and/or molybdenum, about 0-7% by weight, are sometimes used. The brazing method of this invention has been used successfully on all such compositions which are included herein in the term "ferrous powder metal articles".

In general, the density of ferrous powder metal articles will be within the range of from about 5.8 gm/cc. to about 7.2 gm/cc. It is to such articles that this invention is primarily directed. Articles having a density in excess of about 7.2 gm/cc possess a low degree of porosity and conventional brazing and other bonding techniques can be satisfactorily employed.

As stated above, the brazing alloy to be used in this method consists essentially of an alloy of copper and phosphorous. A eutectic alloy of copper-phosphorous (m.p. about 1310° F.) and alloys of silver-copper-phosphorous have been used. All have worked equally well. Three specific examples of such alloys are:

92.88% Cu — 7.12% P
5% Ag — 88.75% Cu — 6.25% P
15% Ag — 80% Cu — 5% P

All are commercially available and have been used in the art for brazing copper articles. They have not been used on ferrous articles because iron ordinarily picks up the phosphorous and forms a brittle joint. This is not significant when considering sintered powder metal articles however because most powder metal articles possess very little elongation anyway. Also, the strength of the bond between the brazing alloy and the powder metal article has been found to be higher than the base powder metal material. When brazing powder metal articles with such alloys, the penetration of the braze into the pores of the article has been found to vary over about 0.002 – 0.010 inches, depending on the base material.

Generally, brazing alloys of higher silver content are advantageously used where two or more parts are being joined, the tolerances are loose, and the gap to be filled is larger than about 0.010 inches.

In accordance with this method, the brazing alloy may be placed into contact with the powder metal article to be brazed in any of the known forms: shims, foils, paste, powder, wire, ring or segment preforms, pressed preforms and the like. Any of the conventional forms and techniques may be used.

The surface to which the brazing alloy is to be applied may first be cleaned of scale, dirt or other foreign material, using any of the standard known chemical or mechanical methods.

The method is preferably carried out in an endothermic reducing atmosphere to prevent oxidation of the powder metal article, but atmosphere is not critical so long as extensive oxidation of the article is avoided. With a flux, an ordinary torch method in air could be used.

One specific example of the preferred method involves the use of a eutectic alloy of copper-phosphorous (92.88% Cu — 7.12% P) having a melting point of about 1310° F. Using such an alloy to braze a sintered powder metal iron article, and brazing at a temperature between the melting point of the alloy and the melting point of copper, i.e., about 1980° F., the brazing alloy did not disperse through or fill the pores of the article but instead remained in the braze area.

The mechanism for this action appears to be that, at the brazing temperature, the phosphorous is selectively alloyed with the iron. When the liquified alloy contacts iron, the phosphorous is immediately depleted from the alloy causing its melting point to rise above that of the brazing temperature. Consequently, the brazing alloy solidifies before it can be drawn through the pores and dispersed. However, the reaction is slow enough so that the alloy is able to flow through the relatively larger opening of a joint or gap to be brazed before solidifying.

An example of the most preferred use of the method lies in the joining of iron powder metal articles. The articles are assembled and a brazing ring of Cu—P or Ag—Cu—P alloy is placed at the joint. The articles are run through a mesh belt furnace in an atmosphere of cracked natural gas of the exothermic and/or endothermic type. Cracked ammonia or hydrogen could also be used. As already pointed out, reducing atmospheres are preferred to prevent oxidation of the articles.

Brazing at a furnace temperature of about 1850°–1900° F. is preferred. Higher temperatures cause the brazing alloy to flow too rapidly. At lower temperatures the alloy is too sluggish.

Joints have been made where an article is inserted into another and the brazing alloy flows by capillary action into the joint upon heating. Also, articles with face to face contact have been brazed. Powder metal articles have been brazed to solid steel and brazed articles have been hardened without cracking the brazed joint.

A preferred method for controlling clearances between powder metal articles is to make the mating articles out of materials having different growth factors in the sintering operation. Assemble the articles together before sintering and they grow together during sintering to form a joint with little clearance. The articles can then be brazed by the method of this invention.

Having described the invention, what is claimed is:

1. A method of brazing a ferrous powder metal article comprising the steps of:
   contacting the part with a brazing alloy consisting essentially of copper and phosphorous,
   heating to a temperature in excess of the melting point of the brazing alloy but below about 1980° F.,
   holding the temperature for a time sufficient to melt the alloy, and
   cooling to produce a metallurgical bond.

2. The method of claim 1 wherein the brazing alloy additionally includes a quantity of silver.

3. The method of claim 1 wherein the brazing alloy is a eutectic alloy of copper and phosphorous.

4. The method of claim 1 wherein the temperature is within the range of about 1300°–1980° F.

5. The method of claim 1 wherein the temperature is within the range of about 1850°–1900° F.

6. The method of claim 1 wherein the article is contacted by another article to form a joint therebetween to be brazed and the brazing alloy is positioned at the joint.

7. The method of claim 1 wherein the heating takes place in a reducing atmosphere.

8. The method of claim 1 wherein the alloy is eutectic copper-phosphorous having a melting point of about 1310° F.

9. The method of claim 1 wherein the alloy is in the form selected from the group consisting of shims, foils, paste, powder, wire and preforms.

10. The method of claim 1 wherein the alloy is selected from the group consisting of Cu—P and Ag—Cu—P.

11. The method of claim 1 wherein the alloy is selected from the group consisting of alloys containing about 92.88% Cu — 7.12% P, 5% Ag — 88.75% Cu — 6.25% P, and 15% Ag — 80% Cu — 5% P.

12. The method of claim 1 wherein the article is contacted by another article to form a joint therebetween to be brazed and the alloy is interspersed between the two articles.

13. The method of claim 12 wherein one of the articles is a powder metal article.

14. The method of claim 12 wherein both articles are powder metal articles.

* * * * *